United States Patent
Bower, III et al.

(10) Patent No.: US 12,007,932 B2
(45) Date of Patent: Jun. 11, 2024

(54) DUAL-ACCESS HIGH-PERFORMANCE STORAGE FOR BMC TO HOST DATA SHARING

(71) Applicant: Lenovo Global Technology (United States) Inc., Morrisville, NC (US)

(72) Inventors: Fred Allison Bower, III, Durham, NC (US); Kevin S. Vernon, Durham, NC (US); Wilson Velez, Raleigh, NC (US); Ming Lei, Shanghai (CN)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 216 days.

(21) Appl. No.: 17/567,724

(22) Filed: Jan. 3, 2022

(65) Prior Publication Data

US 2023/0214347 A1    Jul. 6, 2023

(51) Int. Cl.
*G06F 13/42*  (2006.01)
*G06F 13/22*  (2006.01)
*G06F 13/40*  (2006.01)

(52) U.S. Cl.
CPC ........ *G06F 13/4221* (2013.01); *G06F 13/225* (2013.01); *G06F 13/4022* (2013.01); *G06F 13/409* (2013.01)

(58) Field of Classification Search
CPC ............... G06F 13/4221; G06F 13/225; G06F 13/4022; G06F 13/409; G06F 13/4282
See application file for complete search history.

(56) References Cited

U.S. PATENT DOCUMENTS

| | | | |
|---|---|---|---|
| 9,806,959 B2 | 10/2017 | Christopher et al. | |
| 11,086,813 B1 * | 8/2021 | Schuette | G06F 13/4022 |
| 2018/0285019 A1 * | 10/2018 | Olarig | G06F 3/0604 |
| 2020/0167249 A1 * | 5/2020 | Yamana | G06F 11/2048 |
| 2022/0066895 A1 * | 3/2022 | Itkin | G06F 21/606 |
| 2022/0114027 A1 * | 4/2022 | Puthillathe | G06F 13/387 |

OTHER PUBLICATIONS

BMC Software Inc., "How to use BMC Server Automation for PXE-based provisioning", BMC Server Automation 8.9, date accessed webpage Apr. 4, 2022, pp. 1-30.

* cited by examiner

*Primary Examiner* — Henry Tsai
*Assistant Examiner* — Kim T Huynh
(74) *Attorney, Agent, or Firm* — Kunzler Bean & Adamson; Bruce R. Needham (57) ABSTRACT

An computing device for dual-access high-performance storage for BMC to host data sharing includes a storage device, a host input/output ("IO") domain hardware, a BMC that includes an external data connection, and a switch that includes a connection to the host IO domain hardware, a connection to the storage device, a connection to a root port in the BMC, and a connection to an end point port of the BMC. The switch is configured to connect the host IO domain hardware to the end point port of the BMC and configured to alternately connect the root port of the BMC to the storage device while uploading data from the external data connection to the storage device, and the host IO domain hardware to the storage device to permit the host IO domain hardware to access to the data uploaded from the external data connection.

18 Claims, 4 Drawing Sheets

DUAL-ACCESS HIGH-PERFORMANCE STORAGE FOR BMC TO HOST DATA SHARING

FIELD

The subject matter disclosed herein relates to baseboard management controller ("BMC") to host data sharing and more particularly relates to dual-access high-performance storage for BMC to host data sharing.

BACKGROUND

A baseboard management controller ("BMC") is often included in certain computing devices, such as servers in a datacenter, for managing the computing devices. However, data storage connected to the BMC is often slow and small, which is cumbersome when larger files are uploaded to the computing device for installation of an operating system, for installing a firmware update, etc.

BRIEF SUMMARY

A computing device for dual-access high-performance storage for BMC to host data sharing is disclosed. A method also performs the functions of the computing device. The computing device includes a storage device, host input/output ("IO") domain hardware, a BMC that includes an external data connection, and a switch that includes a connection to the host IO domain hardware, a connection to the storage device, a connection to a root port in the BMC, and a connection to an end point port of the BMC. The switch is configured to connect the host IO domain hardware to the end point port of the BMC and configured to alternately connect the root port of the BMC to the storage device while uploading data from the external data connection to the storage device, and the host IO domain hardware to the storage device to permit the host IO domain hardware to access to the data uploaded from the external data connection.

A method for dual-access high-performance storage for BMC to host data sharing includes connecting, via a switch, host IO domain hardware to an end point port of a BMC. The host IO domain hardware, switch and BMC are located in a computing device and the BMC includes an external data connection. The method includes connecting, via the switch, a root port of the BMC to a storage device in the computing device while a connection between the host IO domain hardware is disconnected, via the switch, from the storage device. The method includes maintaining the connection between the root port of the BMC and the storage device while data from the external data connection is stored on the storage device. The method includes, in response to completion of storage of data from the external data connection, disconnecting, via the switch, the root port of the BMC from the storage device and connecting, via the switch, the host IO domain hardware to the storage device.

Another computing device for dual-access high-performance storage for BMC to host data sharing includes a storage device, host IO domain hardware, a BMC with an external data connection, and a switch with a connection to the host IO domain hardware, a connection to the storage device, a connection to a root port in the BMC, and a connection to an end point port of the BMC. The BMC includes a service processor and memory coupled to the service processor. The memory includes program code configured to connect the host IO domain hardware to the end point port of the BMC, connect the root port of the BMC to the storage device and disconnect the host IO domain hardware from the storage device while uploading data from the external data connection for storage on the storage device, and connect the host IO domain hardware to the storage device and disconnect the root port of the BMC from the storage device while data to be stored on the storage device is not being uploaded from the external data connection.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as program code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in program code and/or software for execution by various types of processors. An identified module of program code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different program code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the program code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of various embodiments.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by program code. This program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of program code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiments. For instance, an arrow may indicate a waiting or monitoring period of unspecified duration between enumerated steps of the depicted embodiments. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

A computing device for dual-access high-performance storage for BMC to host data sharing is disclosed. A method also performs the functions of the computing device. The computing device includes a storage device, a host input/output ("IO") domain hardware, a BMC that includes an external data connection, and a switch that includes a connection to the host IO domain hardware, a connection to the storage device, a connection to a root port in the BMC, and a connection to an end point port of the BMC. The switch is configured to connect the host IO domain hardware to the end point port of the BMC and configured to alternately connect the root port of the BMC to the storage device while uploading data from the external data connection to the storage device, and the host IO domain hardware to the storage device to permit the host IO domain hardware to access to the data uploaded from the external data connection.

In some embodiments, the connection between the switch and the root port of the BMC is configured to run a communication protocol that matches a communication protocol of the connection between the switch and the storage device and the switch and the host IO domain hardware. In other embodiments, the communication protocol of the connection between the root port of the BMC and the switch, the connection between the switch and the storage device and the connection between the switch and the host IO domain hardware is Peripheral Component Interconnect Express ("PCIe") and a communication protocol of the external data connection is Ethernet. In other embodiments, the host IO domain hardware includes hardware circuits coupling a port of the host IO domain hardware to a processor where the port is connected to the switch, or a processor with a port connected to the switch.

In some embodiments, the BMC is configured to direct the switch to disconnect the host IO domain hardware from the storage device and to connect the root port of the BMC in response to receiving a command to upload data from the external data connection to the storage device, and direct the switch to disconnect the BMC from the storage device and to connect the host IO domain hardware to the storage device to enable the host IO domain hardware to access the data uploaded from the external data connection and to access other data stored on the storage device. In other embodiments, the BMC maintains the connection between the host IO domain hardware and the end point port of the BMC while the storage device is connected to the host IO domain hardware and while the storage device is connected to the root port of the BMC.

In some embodiments, the connection between the host IO domain hardware and the switch and the storage device and the switch are wider than the connection between the root port of the BMC and the switch. In other embodiments, the storage device is a solid state storage device ("SSD") configured for general data storage from a processor in communication with the storage device through the connection between the switch and the host IO domain hardware and the connection between the switch and the storage device. In other embodiments, the switch is connected to the host IO domain hardware at a root port of the host IO domain hardware.

A method for dual-access high-performance storage for BMC to host data sharing includes connecting, via a switch, host IO domain hardware to an end point port of a BMC. The host IO domain hardware, switch and BMC are located in a computing device and the BMC includes an external data connection. The method includes connecting, via the switch, a root port of the BMC to a storage device in the computing device while a connection between the host IO domain hardware is disconnected, via the switch, from the storage device. The method includes maintaining the connection between the root port of the BMC and the storage device while data from the external data connection is stored on the storage device. The method includes, in response to completion of storage of data from the external data connection, disconnecting, via the switch, the root port of the BMC from the storage device and connecting, via the switch, the host IO domain hardware to the storage device.

In some embodiments, the connection between the switch and the root port of the BMC is configured to run a communication protocol that matches a communication protocol of the connection between the switch and the storage device and the switch and the host IO domain hardware. In other embodiments, the communication protocol of the connection between the root port of the BMC and the switch, the connection between the switch and the storage device and the connection between the switch and the host IO domain hardware is PCIe and a communication protocol of the external data connection is Ethernet. In other embodiments, the host IO domain hardware includes hardware circuits coupling a port of the host IO domain hardware to a processor where the port is connected to the switch, or a processor with a port connected to the switch.

In some embodiments, the method includes maintaining the connection between the host IO domain hardware and the end point port of the BMC while the storage device is connected to the host IO domain hardware and while the storage device is connected to the root port of the BMC. In other embodiments, the connection between the host IO domain hardware and the switch and the storage device and the switch are wider than the connection between the root port of the BMC and the switch. In other embodiments, the storage device is a SSD configured for general data storage from a processor in communication with the storage device through the connection between the switch and the host IO domain hardware and the connection between the switch and the storage device. In other embodiments, the switch is connected to the host IO domain hardware at a root port of the host IO domain hardware.

Another computing device for dual-access high-performance storage for BMC to host data sharing includes a storage device, a host IO domain hardware, a BMC with an external data connection, and a switch with a connection to the host IO domain hardware, a connection to the storage device, a connection to a root port in the BMC, and a connection to an end point port of the BMC. The BMC includes a service processor and computer readable storage media coupled to the service processor. The computer readable storage media includes program code configured to connect the host IO domain hardware to the end point port of the BMC, connect the root port of the BMC to the storage device and disconnect the host IO domain hardware from the storage device while uploading data from the external data connection for storage on the storage device, and connect the host IO domain hardware to the storage device and disconnect the root port of the BMC from the storage device while data to be stored on the storage device is not being uploaded from the external data connection.

In some embodiments, the connection between the switch and the root port of the BMC is configured to run a communication protocol that matches a communication protocol of the connection between the switch and the storage device and the switch and the host IO domain hardware. In other embodiments, the program code is further configured to maintain the connection between the host IO domain hardware and the end point port of the BMC while the storage device is connected to the host IO domain hardware and while the storage device is connected to the root port of the BMC.

Figure 1:
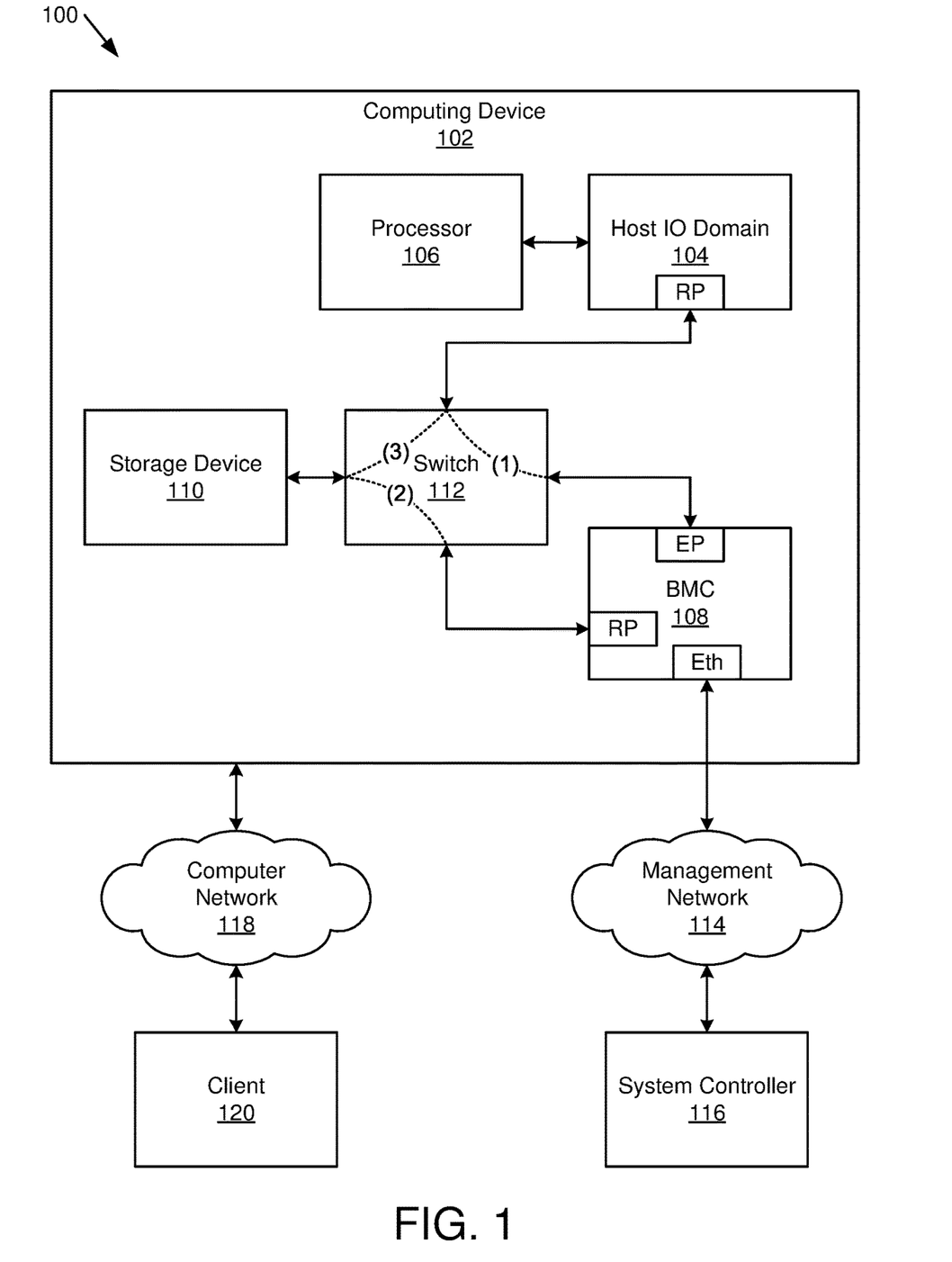
FIG. 1 is a schematic block diagram illustrating a system with a computing device for dual-access high-performance storage for BMC to host data sharing according to various embodiments.

FIG. 1 is a schematic block diagram illustrating a system 100 with a computing device 102 for dual-access high-performance storage for BMC to host data sharing, according to various embodiments. The system includes a computing device 102 with host input/output ("IO") domain hardware 104, a processor 106, a baseboard management controller ("BMC"), a storage device 110, a switch 112, along with a management network 114, a system controller 116, computer network 118 and a client 120, which are described below.

The computing device 102 is any device that includes a BMC 108 connected via an external connection to a management network 114. The connection to the management network 114 is an external connection because it is a connection external to the computing device 102. The computing device 102, in some embodiments, is a server, compute node, etc. in a datacenter. In some embodiments, the computing device 102 is connected to one or more clients 120 over a computer network 118 and runs workloads for the client 120. In some embodiments, the computing device 102 runs virtual machines or containers for running workloads for the clients 120. A BMC 108 is provided in the computing device 102 typically for management functions when the computing device 102 is running or not running. For example, the BMC 108 may be used to install firmware on the computing device 102.

In some embodiments, the computing device 102 is rack mounted. In other embodiments, the computing device 102 is a desktop computer, a workstation, a mainframe computer, or the like. In other embodiments, the computing device 102 includes one or more processors 106, which may include one or more cores. The computing device 102 typically includes a graphics processing unit ("GPU"), and may include one or more accelerators. The computing device 102, in some embodiments is called a host. The computing device 102 includes memory connected to the processor 106, IO connections, and other typical components of a computing device 102.

The computing device 102 includes host IO domain hardware 104 that at least functions as an interface between the processor 106 and the BMC 108 and the processor 106 and the storage device 110. The host IO domain hardware 104 includes the IO domain for the computing device 102. The host IO domain hardware 104 may include bussing and a chipset and may also include other hardware. For example, the host IO domain hardware 104 include a north bridge and a south bridge. The host IO domain hardware 104 includes a connection suitable for connecting to the storage device 110, which, in some embodiments, is primarily for use by the processor 106 in servicing workloads. Typically, this type of data storage is high-performance and the connection between the host IO domain hardware 104 and the storage device 110 is high bandwidth and fast enough to service workloads. In some embodiments, the processor 106 includes the functions of the host IO domain hardware 104. In these embodiments, the processor 106 and host IO domain hardware 104 may be represented as a single block connected to the switch 112.

The storage device 110 depicted herein that is used for servicing workloads differs from other designs with a small storage device accessible to the BMC 108 that typically has a slow connection between the BMC 108 and this small storage device. The small storage device typically also has a very limited capacity and is not connected to the host IO domain hardware 104. Often the small storage device accessible to the BMC 108 is small because it is not used very often so designers use low performance and/or low capacity storage to reduce cost. In these other designs, the connection between the BMC 108 and small storage device may use a Universal Serial Bus ("USB") connection, which is relatively slow. While these other designs do include a connection between the host IO domain hardware 104 and the BMC 108, often times the combination of a slow connection between the BMC 108 and the small storage device and the limited capacity of the small storage device create a bottleneck when trying to upload a large file over the management network 114 to the computing device 102, such as a large firmware file, an operating system, etc. Often times large files uploaded through the BMC 108 must be done in multiple steps, which is cumbersome and slow.

The BMC 108 is often included on certain computing devices, such as the computing device 102 of FIG. 1 to provide management functions in a way that allows the computing device 102 to continue to service workloads without interruption. The BMC 108 typically also provides a mechanism to access the computing device 102 while the computing device 102 is not operating or is not functional for some reason. The BMC 108 may be used for firmware updates, may be used to install or update an operating system, and other similar functions. The BMC 108 provides a way for a system administrator to use a remote system controller 116 to access a group of computing devices 102 without physically going to each computing device 102. BMCs 108 are widely used in the computing industry, especially in places like datacenters.

In some embodiments, the BMC 108 is referred to as a service processor. The BMC 108 is typically small and is a system on a chip solution. The BMC 108 may also be used for management and monitoring of other physical devices of the computing device 102, such as for fans, power supplies, etc. and for other telemetry functions, such as temperature monitoring. In some embodiments, the BMC 108 is an XClarity® Controller ("XCC") by Lenovo®. In other embodiments, the BMC 108 is an Integrated Management Module ("IMM") by Lenovo® or IBM®. One of skill in the art will recognize other forms of a BMC 108 that may be used with the embodiments described herein. Connections to the BMC 108 are described below.

Clients 120 include computing devices that have access to the computing device 102 of FIG. 1. A Client 120 may include a desktop computer, a tablet computer, a cellphone, a workstation, a laptop computer, and the like. The computer network 118 may include a LAN, a WAN, a fiber channel network, a wireless connection, the Internet, etc. and may include any combination of networks. The management network 114 may also include a LAN, a WAN, wireless connection, etc. but is typically a private network or includes a secure connection between the system controller 116 and the BMC 108. The management network 114 is often an ethernet connection ("Eth" in the BMC 108). Often the management network 114 uses a management-specific protocol, such as Intelligent Platform Management Interface ("IPMI"), Redfish, Simple Network Management Protocol ("SNMP"), and the like. The system controller 116 is a computing device accessible to a system administrator that connects to the BMC 108 over the management network 114. The system controller 116 includes any computing device capable of running system management software for managing the computing device 102 through the BMC 108. The system controller 116 may be a laptop, a desktop computer, a cellphone, a tablet computer, etc.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™

Alternatively, the wireless connection may employ a ZigBee® connection based on the IEEE 802 standard. In some embodiments, the wireless connection employs a Z-Wave® connection as designed by Sigma Designs®. Alternatively, the wireless connection may employ an ANT® and/or ANT-F® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

The switch 112 includes a connection to the host IO domain hardware 104, to the storage device 110 and two connections to the BMC 108. Typically, the switch 112 is capable of high-speed, high-capacity performance equaling performance requirements of the connection between the host IO domain hardware 104 and the storage device 110. In some embodiments, at least one connection between the BMC 108 and the storage device 110 runs a same protocol or has similar performance capabilities as the host IO domain hardware 104 to storage device 110 connection. In some embodiments, the connections to the switch 112 are Peripheral Component Interconnect Express ("PCIe") connections. In other embodiments, the connections to the switch 112 use another communication protocol suitable for high-speed transfer of data between the host IO domain hardware 104 and the storage device 110. In some embodiments, the connection between the host IO domain hardware 104 and the storage device 110 is wider than the connection between the BMC 108 and the storage device 110. For example, the connection between the storage device 110 and the BMC 108 may be a connection that has a width that is a "by-one" link while the connection between the connection between the host IO domain hardware 104 and the storage device may be a by-2 or by-4 link.

Typically, the connection at the host IO domain hardware 104 to the switch 112 is a root port ("RP"). Typically, a root port is not connected to another root port but is connected to one or more end points ("EP"). In previous designs, the BMC 108 is an end point for a connection between a root port of the host IO domain hardware 104 and the BMC 108. The host IO domain hardware 104 also includes a connection to a storage device 110 capable of servicing workloads where the port in the host IO domain hardware 104 is a root port and the storage device 110 is an end point.

In the embodiments described herein, the BMC 108 includes a connection from the host IO domain hardware 104 to an end point connection in the BMC 108 through the switch 112 (see dashed line marked with a (1) in the switch 112) and also includes a second connection to the switch 112 from a root port of the BMC 108 and that is capable of connection to the storage device 110 (see the dashed line in the switch 112 marked with a (2)). This design enables connection between the BMC 108 and the storage device 110 or a connection between the host IO domain hardware 104 and the storage device 110 where either the host IO domain hardware 104 or the BMC 108, whichever is connected, can control interaction with the storage device 110. This design also maintains a connection between the host IO domain hardware 104 and the end point of the BMC 108.

Thus, the switch 112 is configured to connect the host IO domain hardware 104 to the end point port of the BMC 108 and configured to alternately 1) connect the root port of the BMC 108 to the storage device 110 while uploading data from the management network 114 (e.g. external data connection) to the storage device 110 and 2) connect the host IO domain hardware 104 to the storage device 110 to permit the host IO domain hardware 104 to access to the data uploaded from the external data connection of the management network 114. Beneficially, first connecting the BMC 108 to the storage device 110 through the switch 112 allows access to a large storage device 110 over a connection that is relatively fast compared with previous designs. Once the data is uploaded, beneficially, the switch 112 disconnects the BMC 108 from the storage device 110 and the switch 112 connects the host IO domain hardware 104 to the storage device 110, which allows the processor 106 to access the uploaded data. The switch 112 maintains the connection between the host IO domain hardware 104 and the end point connection of the BMC 108 to allow the BMC 108 to direct use of the uploaded data.

Figure 2:
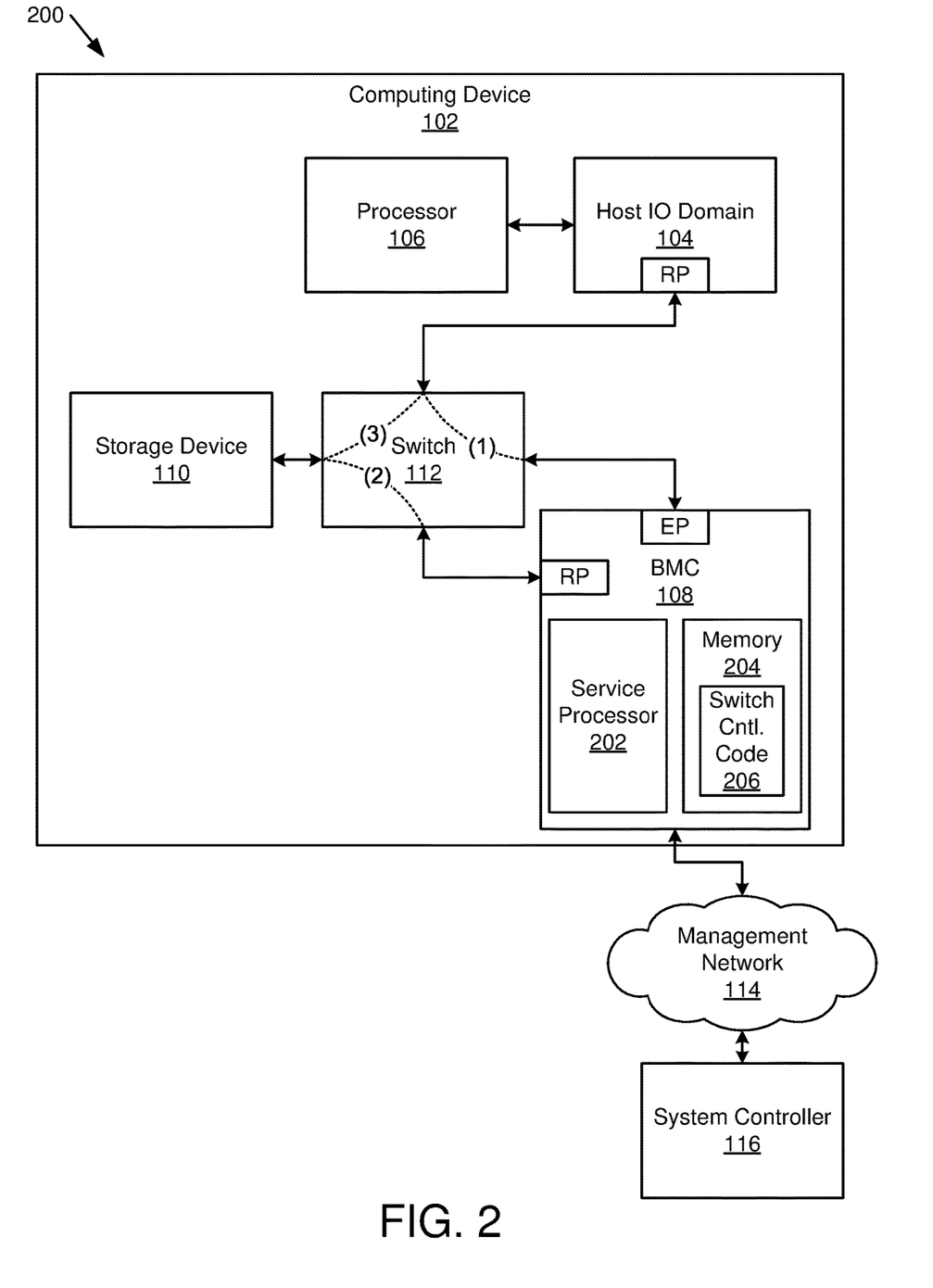
FIG. 2 is a schematic block diagram illustrating another a system with a computing device for dual-access high-performance storage for BMC to host data sharing according to various embodiments according to various embodiments.

FIG. 2 is a schematic block diagram 200 illustrating another computing device 102 for dual-access high-performance storage for BMC to host data sharing, according to various embodiments. The diagram 200 in FIG. 2 includes other embodiments of the BMC 108 that includes a service processor 202 and memory 204 with switch control code 206. The components of the computing device 102, which are the host IO domain hardware 104, the processor 106, the BMC 108, the storage device 110 and the switch 112 are substantially similar to the system 100 of FIG. 1.

The service processor 202 is a processor in the BMC 108 and the term service processor 202 is used to distinguish this processor from the processor 106 of the computing device 102. Often the BMC 108 is called a "service processor" which, in some embodiments, connotes the entire BMC 108 or the entire functionality of a BMC. The service processor 202 includes functionality for interfacing with the system controller 116 and management network 114 and for management of the computing device 102. In some embodiments, the service processor 202 has less functionality than the processor 106 of the computing device 102.

The memory 204 is accessible to the service processor 202 and includes switch control code 206, which in some embodiments is program code executable on the service processor 202. The switch control code 206, in some embodiments, controls the switch 112. In some examples, the switch control code 206, while executing on the service processor 202, maintains the connection between end point of the BMC 108 and the host IO domain hardware 104 while connecting the BMC 108 to the storage device 110 while maintaining the connection between the host IO domain hardware 104 and the storage device 110 in a disconnected state and then disconnecting the BMC 108 from the storage device 110 while connecting the host IO domain hardware 104 and the storage device 110.

Typically, the switch control code 206 is configured to command the switch 112 to maintain the connection between the host IO domain hardware 104 and the storage device 110 for normal operation of the processor 106 at least while servicing workloads and other normal operations. In some embodiments, the switch control code 206 is configured to command the switch 112 to disconnect the host IO domain hardware 104 from the storage device 110 and connect the root port of the BMC 108 to the storage device 110 when the BMC 108 is uploading data to the storage device 110 that needs to be accessible to the computing device 102, for example during installation or update of an operating system, during updating of firmware of the computing device 102, or other maintenance operation. Once the data is uploaded to the storage device 110 through the BMC 108, the switch control code 206 is configured to command the switch 112 to disconnect the storage device 110 from the BMC 108 and connect the host IO domain hardware 104 to the storage device 110 to access the uploaded data.

While a service processor 202 and memory 204 with switch control code 206 are depicted, in other embodiments, the functionality of the service processor 202, memory 204, and switch control code 206 are implemented with an FPGA or similar device. In some embodiments, the switch control code 206 is configured to command the switch 112 directly. In other embodiments, the switch control code 206 is configured to send switch control requests to the host IO domain hardware 104 and or processor 106, which then sends commands to the switch 112. The data uploaded from the BMC 108 to the storage device 110 may include operating system components, firmware updates, or other files for management of the computing device 102.

Figure 3:
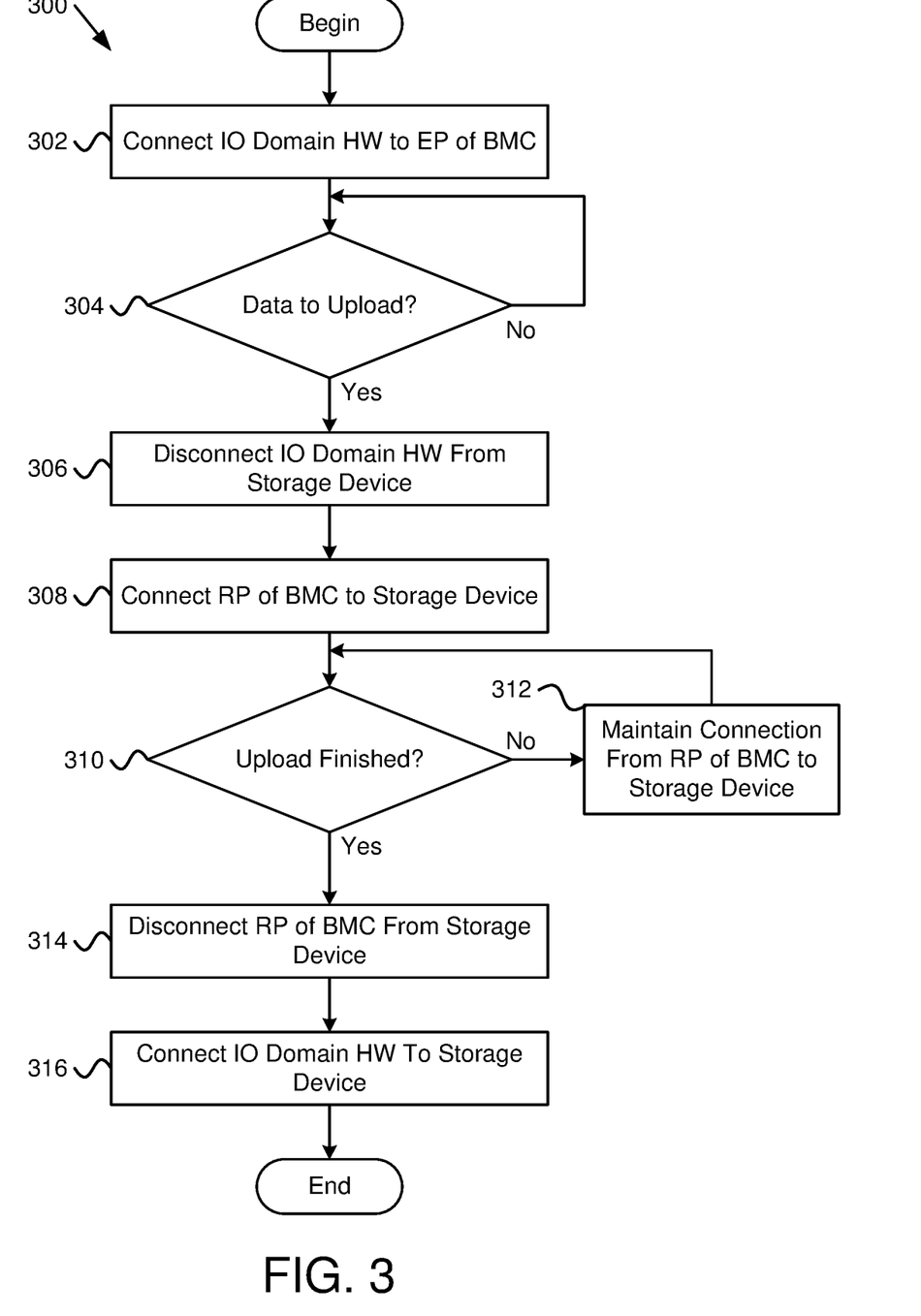
FIG. 3 is a schematic flow chart diagram illustrating a method for dual-access high-performance storage for BMC to host data sharing according to various embodiments.

FIG. 3 is a schematic flow chart diagram illustrating a method 300 for dual-access high-performance storage for BMC to host data sharing, according to various embodiments. The method 300 begins and connects 302, via a switch 112, host IO domain hardware 104 to an end point port of a BMC 108. The host IO domain hardware 104, switch 112 and BMC 108 are located in a computing device 102. The BMC 108 includes an external data connection, which in some embodiments, is to a management network 114. The external data connection may be to a system controller 116 or similar device.

The method 300 determines 304 if there is data to be uploaded to the computing device 102 from the external data connection. If the method 300 determines 304 that there is no data to be uploaded to the computing device 102, the method 300 returns and continues to determine 304 if there is data to be uploaded to the computing device 102, for example, for a firmware update, for installing an operating system on the computing device 102, etc. If the method 300 determines 304 that there is data to be uploaded to the computing device 102 via the external data connection, the method 300 disconnects 306, via the switch 112, the host IO domain hardware 104 from a storage device 110 in the computing device 102 and connects 308, via the switch 112, a root port of the BMC 108 to the storage device 110 in the computing device 102.

The method 300 determines 310 if the upload of the data is finished. If the method 300 determines 310 that the upload has not finished, the method 300 maintains 312 the connection between the BMC 108 and the storage device 110 and again determines 310 if the upload is finished. If the method 300 determines 310 that the upload has finished, the method 300 disconnects 314, via the switch 112, the root port of the BMC 108 from the storage device 110 and connects 316, via the switch 112, the host IO domain hardware 104 to the storage device 110, and the method 300 ends. In various embodiments, all or a portion of the method 300 is implemented with the switch control code 206 in the memory of the BMC 108. In other embodiments, a portion of the switch control code 206 is located in the host IO domain hardware 104 and/or the switch 112. In other embodiments, the method 300 is implemented with a programmable hardware device and/or hardware circuits.

Figure 4:
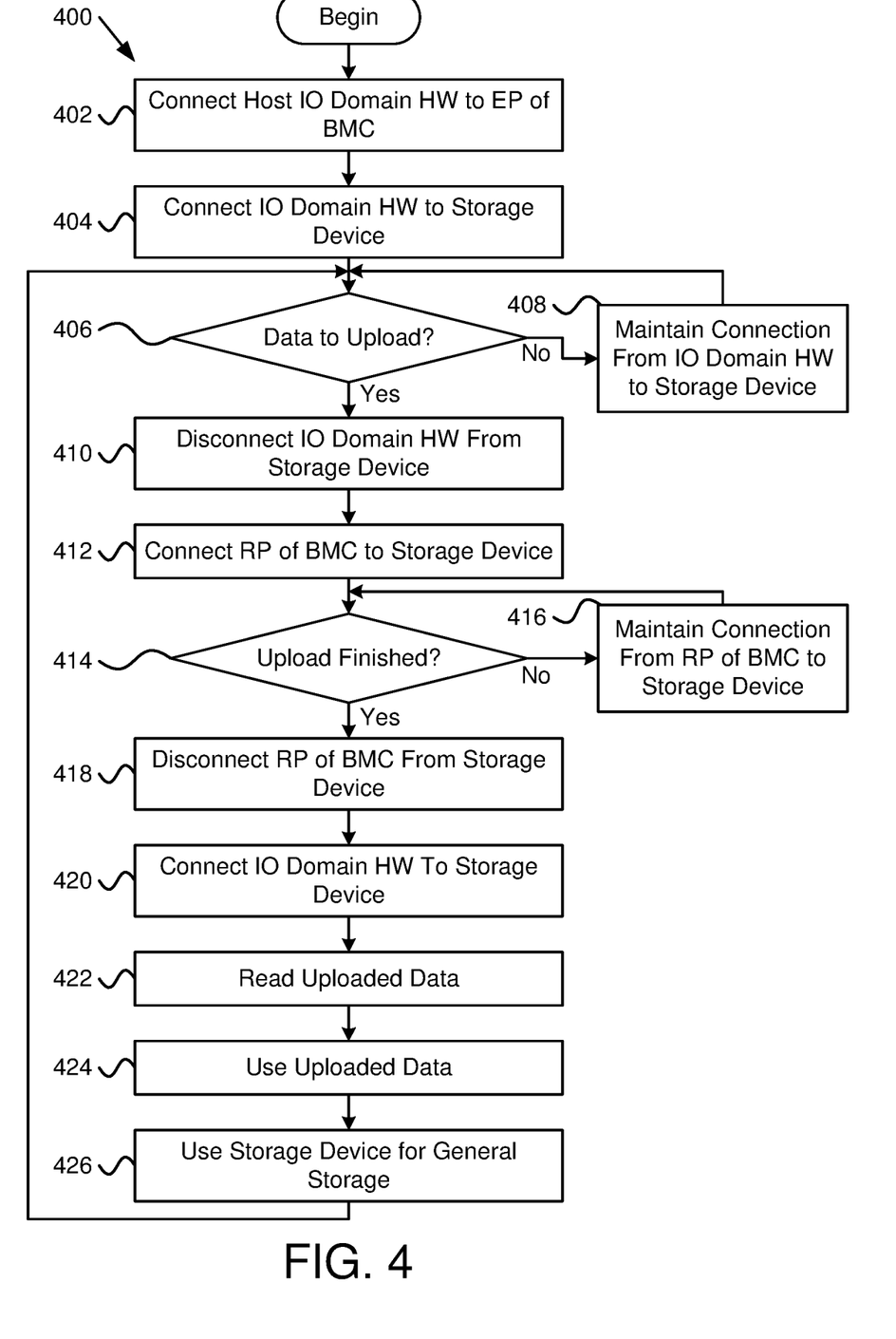
FIG. 4 is a schematic flow chart diagram illustrating another a method for dual-access high-performance storage for BMC to host data sharing according to various embodiments.

FIG. 4 is a schematic flow chart diagram illustrating another method 400 for dual-access high-performance storage for BMC to host data sharing, according to various embodiments. The method 400 begins and connects 402, via a switch 112, host IO domain hardware 104 to a BMC 108 and connects 404, via the switch 112, the host IO domain hardware 104 to a storage device 110, where the host IO domain hardware 104, the storage device 110, the switch 112, and the BMC 108 are located in a computing device 102. The method 400 determines 406 if there is data to be uploaded to the computing device 102 via an external connection to the BMC 108, for example, via a management network 114 from a system controller 116. If the method 400 determines 406 that there is not any data to upload to the computing device 102, the method 400 maintains 408 the connection between the host 10 domain hardware 104 and the storage device 110 and returns and continues to determine 406 if there is data to upload via the external data connection to the BMC 108.

If the method 400 determines 406 that there is data to upload to the computing device 102, the method 400 disconnects 410, via the switch 112, the host IO domain hardware 104 from the storage device 110 and connects 412, via the switch 112, the root port of the BMC 108 to the storage device 110 and determines 414 if the upload is finished. If the method 400 determines 414 that the upload is not finished, the method 400 maintains 416 the connection between the root port of the BMC 108 and the storage device 110 and continues to determine 414 if the upload is finished. If the method 400 determines 414 that the upload has finished, the method 400 disconnects 418, via the switch 112, the root port of the BMC 108 from the storage device 110 and connects 420, via the switch 112, the host IO domain hardware 104 to the storage device 110.

The method 400 reads 422 the uploaded data and then uses 424 the uploaded data, for example, to install an operating system, to update firmware, etc. The method 400 then uses 426 the storage device 110 for general data storage, for example, when servicing workloads, and the method 400 returns and determines 406 if there is data to be uploaded from the external data connection. In various embodiments, all or a portion of the method 400 is implemented with the switch control code 206 in the memory of the BMC 108. In other embodiments, a portion of the switch control code 206 is located in the host IO domain hardware 104 and/or the switch 112. In other embodiments, the method 300 is implemented with a programmable hardware device and/or hardware circuits.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing device comprising:
    a storage device;
    host input/output ("IO") domain hardware;
    a baseboard management controller ("BMC") comprising an external data connection; and
    a switch comprising a connection to the host IO domain hardware, a connection to the storage device, a connection to a root port in the BMC, and a connection to an end point port of the BMC,
    wherein the switch is configured to connect the host IO domain hardware to the end point port of the BMC and configured to alternately connect:
        the root port of the BMC to the storage device while uploading data from the external data connection to the storage device; and
        the host IO domain hardware to the storage device to permit the host IO domain hardware to access to the data uploaded from the external data connection, and
    wherein the host IO domain hardware comprises hardware circuits coupling a port of the host IO domain hardware to a processor, the port connected to the switch, or a processor comprising a port connected to the switch.

2. The computing device of claim 1, wherein the connection between the switch and the root port of the BMC is configured to run a communication protocol that matches a communication protocol of the connection between the switch and the storage device and the switch and the host IO domain hardware.

3. The computing device of claim 2, wherein the communication protocol of the connection between the root port of the BMC and the switch, the connection between the switch and the storage device and the connection between the switch and the host IO domain hardware is Peripheral Component Interconnect Express ("PCIe") and a communication protocol of the external data connection is Ethernet.

4. The computing device of claim 1, wherein the BMC is configured to:
    direct the switch to disconnect the host IO domain hardware from the storage device and to connect the root port of the BMC in response to receiving a command to upload data from the external data connection to the storage device; and
    direct the switch to disconnect the BMC from the storage device and to connect the host IO domain hardware to the storage device to enable the host IO domain hardware to access the data uploaded from the external data connection and to access other data stored on the storage device.

5. The computing device of claim 1, wherein the BMC maintains the connection between the host IO domain hardware and the end point port of the BMC while the storage device is connected to the host IO domain hardware and while the storage device is connected to the root port of the BMC.

6. The computing device of claim 1, wherein the connection between the host IO domain hardware and the switch and the storage device and the switch are wider than the connection between the root port of the BMC and the switch.

7. The computing device of claim 1, wherein the storage device is a solid state storage device ("SSD") configured for general data storage from a processor in communication with the storage device through the connection between the switch and the host IO domain hardware and the connection between the switch and the storage device.

8. The computing device of claim 1, wherein the switch is connected to the host IO domain hardware at a root port of the host IO domain hardware.

9. A method comprising:
    connecting, via a switch, host input/output ("IO") domain hardware to an end point port of a baseboard management controller ("BMC"), the host IO domain hardware, switch and BMC located in a computing device, the BMC comprising an external data connection;
    connecting, via the switch, a root port of the BMC to a storage device in the computing device while a connection between the host IO domain hardware is disconnected, via the switch, from the storage device;
    maintaining the connection between the root port of the BMC and the storage device while data from the external data connection is stored on the storage device; and
    in response to completion of storage of data from the external data connection, disconnecting, via the switch, the root port of the BMC from the storage device and connecting, via the switch, the host IO domain hardware to the storage device,
    wherein the host IO domain hardware comprises hardware circuits coupling a port of the host IO domain hardware to a processor, the port connected to the switch, or a processor comprising a port connected to the switch.

10. The method of claim 9, wherein the connection between the switch and the root port of the BMC is configured to run a communication protocol that matches a communication protocol of the connection between the switch and the storage device and the switch and the host IO domain hardware.

11. The method of claim 10, wherein the communication protocol of the connection between the root port of the BMC and the switch, the connection between the switch and the storage device and the connection between the switch and the host IO domain hardware is Peripheral Component Interconnect Express ("PCIe") and a communication protocol of the external data connection is Ethernet.

12. The method of claim 10, further comprising maintaining the connection between the host IO domain hardware and the end point port of the BMC while the storage device is connected to the host IO domain hardware and while the storage device is connected to the root port of the BMC.

13. The method of claim 9, wherein the connection between the host IO domain hardware and the switch and the storage device and the switch are wider than the connection between the root port of the BMC and the switch.

14. The method of claim 9, wherein the storage device is a solid state storage device ("SSD") configured for general data storage from a processor in communication with the storage device through the connection between the switch and the host IO domain hardware and the connection between the switch and the storage device.

15. The method of claim 9, wherein the switch is connected to the host IO domain hardware at a root port of the host IO domain hardware.

16. A computing device comprising:
 a storage device;
 host input/output ("IO") domain hardware;
 a baseboard management controller ("BMC") comprising an external data connection; and
 a switch comprising a connection to the host IO domain hardware, a connection to the storage device, a connection to a root port in the BMC, and a connection to an end point port of the BMC,
 wherein the BMC comprises a service processor and non-volatile computer readable storage media coupled to the service processor, the computer readable storage media comprising program code configured to:
  connect the host IO domain hardware to the end point port of the BMC;
  connect the root port of the BMC to the storage device and disconnect the host IO domain hardware from the storage device while uploading data from the external data connection for storage on the storage device; and
  connect the host IO domain hardware to the storage device and disconnect the root port of the BMC from the storage device while data to be stored on the storage device is not being uploaded from the external data connection, and
 wherein the host IO domain hardware comprises hardware circuits coupling a port of the host IO domain hardware to a processor, the port connected to the switch, or a processor comprising a port connected to the switch.

17. The computing device of claim 16, wherein the connection between the switch and the root port of the BMC is configured to run a communication protocol that matches a communication protocol of the connection between the switch and the storage device and the switch and the host IO domain hardware.

18. The computing device of claim 16, wherein the program code is further configured to maintain the connection between the host IO domain hardware and the end point port of the BMC while the storage device is connected to the host IO domain hardware and while the storage device is connected to the root port of the BMC.

* * * * *